(12) United States Patent
Weiland et al.

(10) Patent No.: US 9,664,319 B2
(45) Date of Patent: May 30, 2017

(54) COUPLING PART FOR A QUICK-RELEASE COUPLING FOR HIGH-PRESSURE HYDRAULIC LINES

(71) Applicant: U.M. Gewerbeimmobilien GmbH & Co. KG, Werdohl (DE)

(72) Inventors: Fritz Georg Weiland, Meinerzhagen (DE); Juergen Hartmann, Breckerfeld (DE)

(73) Assignee: U.M. Gewerbeimmobilien GmbH & Co. KG, Werdohl (DE)

( * ) Notice: Subject to any disclaimer, the term of this patent is extended or adjusted under 35 U.S.C. 154(b) by 64 days.

(21) Appl. No.: 14/741,682

(22) Filed: Jun. 17, 2015

(65) Prior Publication Data

US 2015/0369410 A1 Dec. 24, 2015

(30) Foreign Application Priority Data

Jun. 18, 2014 (DE) ........................ 10 2014 009 046

(51) Int. Cl.
*F16L 29/02* (2006.01)
*F16L 37/23* (2006.01)
(Continued)

(52) U.S. Cl.
CPC ............... *F16L 29/02* (2013.01); *F16K 1/38* (2013.01); *F16K 1/42* (2013.01); *F16L 37/23* (2013.01); *F16L 37/32* (2013.01)

(58) Field of Classification Search
CPC . F16L 29/02; F16L 37/32; F16L 37/23; F16K 1/38; F16K 1/42
(Continued)

(56) References Cited

U.S. PATENT DOCUMENTS 2,327,611 A * 8/1943 Schelwer ............ F16L 37/0982
251/149.6
4,087,834 A 5/1978 Temple
(Continued)

FOREIGN PATENT DOCUMENTS

DE 27 12 117 B1 9/1978
DE 30 15 485 C2 6/1982
(Continued)

OTHER PUBLICATIONS

German Search Report dated Oct. 29, 2014 in German Application No. 10 2014 009 046.9 with English translation of the relevant parts.
(Continued)

*Primary Examiner* — Mary McManmon
*Assistant Examiner* — Nicole Gardner
(74) *Attorney, Agent, or Firm* — Collard & Roe, P.C.

(57) ABSTRACT

A coupling part, particularly a coupling cuff, for a quick-release coupling for high-pressure hydraulic lines, has a coupling housing having a through-flow channel and a valve device disposed within the through-flow channel, this device having a tappet-like closing valve for closing off the through-flow channel in the uncoupled state of the coupling part. The coupling housing has a conical valve seat surface, and the closing valve has a longitudinal valve axis as well as a valve head having a conical surface and a valve sealing ring for sealing contact with the valve seat surface. The valve sealing ring has a circular-cylindrical ring circumference surface that projects beyond the conical surface in the radial direction and has a valve seal diameter $D_{VD}$. The flow-through channel has a ring-shaped cross-sectional widened region having a maximal expansion diameter $D_{EW}$, wherein the cross-sectional expansion region lies radially opposite the ring circumference surface in the maximally
(Continued)

open position of the closing valve, with regard to the longitudinal valve axis.

20 Claims, 11 Drawing Sheets

(51) Int. Cl.
    *F16L 37/32*     (2006.01)
    *F16K 1/38*     (2006.01)
    *F16K 1/42*     (2006.01)

(58) Field of Classification Search
    USPC ................................................ 251/149.6
    See application file for complete search history.

(56) References Cited

U.S. PATENT DOCUMENTS

| | | | |
|---|---|---|---|
| 4,200,121 A | 4/1980 | Walter et al. | |
| 4,394,874 A * | 7/1983 | Walter | F16L 37/23 137/614.02 |
| 4,702,278 A * | 10/1987 | Badoureaux | F16L 37/32 137/614 |
| 6,886,803 B2 * | 5/2005 | Mikiya | F16L 37/32 137/614.03 |
| 7,708,029 B2 * | 5/2010 | Kitagawa | F16L 37/34 137/614.03 |
| 7,806,139 B2 * | 10/2010 | Packham | A61M 39/10 137/614.04 |
| 2007/0246107 A1 | 10/2007 | Kitagawa et al. | |
| 2009/0091129 A1 * | 4/2009 | Moriiki | F16L 37/23 285/321 |

FOREIGN PATENT DOCUMENTS

| | | |
|---|---|---|
| DE | 27 12 114 C2 | 5/1985 |
| DE | 36 34 624 A1 | 4/1988 |
| EP | 1 840 442 A1 | 10/2007 |
| EP | 2 505 899 A1 | 10/2012 |

OTHER PUBLICATIONS

European Search Report dated Oct. 21, 2015 in European Application No. 15 17 1274 with English translation of the relevant parts.

\* cited by examiner

COUPLING PART FOR A QUICK-RELEASE COUPLING FOR HIGH-PRESSURE HYDRAULIC LINES

CROSS REFERENCE TO RELATED APPLICATIONS

Applicant claims priority under 35 U.S.C. §119 of German Application No. 10 2014 009 046.9 filed Jun. 18, 2014, the disclosure of which is incorporated by reference.

BACKGROUND OF THE INVENTION

1. Field of the Invention

The present invention relates to a coupling part, particularly a coupling cuff, for a quick-release coupling for high-pressure hydraulic lines, as well as to a quick-release coupling having such a coupling part.

2. Description of the Related Art

Such quick-release couplings guarantee rapid connecting and disconnecting of two hydraulic lines. They are configured, for example, as plug-in couplings, and have two coupling parts that can be plugged into one another, namely a coupling plug and a coupling cuff. The coupling plug can be inserted into an accommodation opening of the coupling cuff, and can be releasably locked together with it. Each coupling part furthermore has a coupling housing, within which a spring-loaded valve is disposed. In the uncoupled state, the valves are disposed so that they close off the respective coupling part. When the two coupling parts are inserted into one another, the valves reciprocally open automatically, and when they are uncoupled, the valves close automatically.

Such a quick-release coupling is known, for example, from DE 27 12 114 C2. A further quick-release coupling is known from DE 30 15 485 C2.

SUMMARY OF THE INVENTION

It is the task of the present invention to make available a cost-advantageous coupling part for a quick-release coupling, particularly a plug-in coupling, for hydraulic high-pressure lines, which part is suitable for a very great through-flow amount.

A further task is to make available a quick-release coupling having at least one such coupling part.

These tasks are accomplished by a coupling part according to one aspect of the invention and a quick-release coupling according to another aspect of the invention. Advantageous further developments of the invention are discussed below.

In one aspect, a coupling part, particularly a coupling cuff, for a quick release coupling for high-pressure hydraulic lines, is provided. The coupling part has a coupling housing having a through-flow channel and a valve device disposed within the through-flow channel, this device having a tappet-like closing valve for closing off the through-flow channel in the uncoupled state of the coupling part, wherein the coupling housing has a conical valve seat surface.

The closing valve has a longitudinal valve axis as well as a valve head having a conical surface and a valve sealing ring for sealing contact with the valve seat surface, wherein the valve sealing ring has a ring circumference surface that projects beyond the conical surface in the radial direction and has a valve seal diameter $D_{VD}$.

The flow-through channel has a ring-shaped cross-sectional widened region having a maximal expansion diameter $D_{EW}$, wherein the cross-sectional expansion region lies radially opposite the ring circumference surface in the maximally open position of the closing valve, with regard to the longitudinal valve axis.

In another aspect, a quick-release coupling, particularly a plug-in coupling, for high-pressure hydraulic lines, is provided. The coupling has two coupling parts that can be releasably locked together with one another, particularly a coupling cuff and a coupling plug, wherein the coupling parts each have a coupling housing having a through-flow channel and a valve device disposed within the through-flow channel, the device having a tappet-like closing valve for closing the through-flow channel in the uncoupled state of the quick-release coupling. At least one of the two coupling parts is configured according to the first aspect of the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
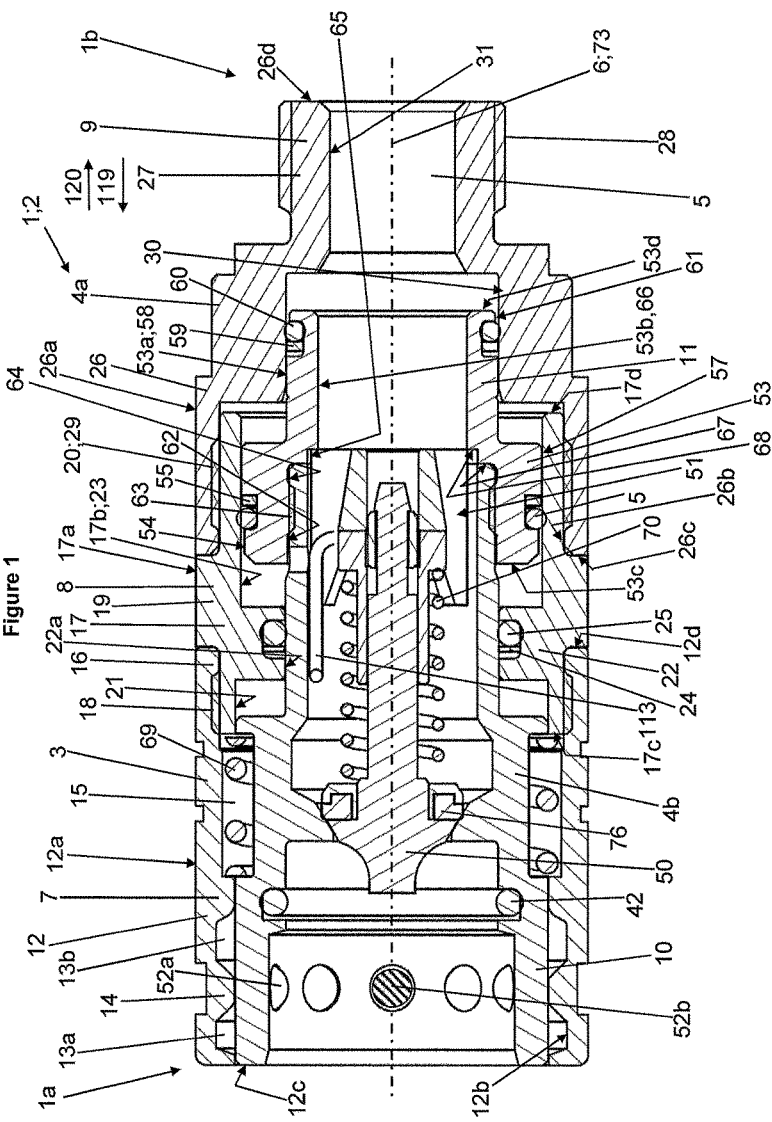
FIG. 1 is a longitudinal section through the coupling cuff according to the invention, with a closing valve in the closed position, with a two-part bearing sleeve and a chambering sleeve according to the state of the art.

The coupling part 1 (FIG. 1) according to the invention, of a quick-release coupling, particularly a plug-in coupling, for high-pressure hydraulic lines, is preferably a coupling cuff 2. The coupling cuff 2 has a coupling housing 3 having a sleeve-like outer housing part 4a and a sleeve-like inner housing part 4b, as well as a coupling axis 6. The coupling part 1, particularly the coupling cuff 2, furthermore has a coupling end 1a and a connection or line end 1b, wherein the two ends 1a, 1b lie opposite one another in the direction of the coupling axis 6. At the coupling end 1a, the coupling part 1 is connected with a corresponding counter-coupling part (not shown) of the quick-release coupling. In the case of the coupling cuff 2, the counter-coupling part is a coupling plug. At the connector end 1b, the coupling part 1, particularly the coupling cuff 2, is connected with the hydraulic line.

The terms used hereinafter, "axially," "radially," and "in the circumference direction" always relate, unless specified otherwise, to the coupling axis 6 or to a longitudinal valve axis 73 that is coaxial to it. The term "circular-cylindrical" also relates to the coupling axis 6 and to the longitudinal valve axis 73 as the center axis or axis of rotation.

The coupling housing 3 has a through-flow channel or flow channel 5 for the hydraulic medium, which channel is continuous from the coupling end 1a to the connector end 1b. The through-flow channel 5 therefore extends through the coupling housing 3 in the direction of the coupling axis 6.

Viewed in the direction of the coupling axis 6, from the coupling end 1a toward the connector end 1b, the outer housing part 4a has a blocking or locking or engagement sleeve 7, a connection sleeve 8, as well as a connector sleeve or a connector part 9. The inner housing part 4b is preferably configured in two parts and, viewed in the direction of the coupling axis 6, from the coupling end 1a toward the connector end 1b, has a valve seat sleeve 10 and a pressure-bearing sleeve 11.

The blocking sleeve 7 (FIG. 1) preferably consists of metal, particularly of machining steel or nitrided steel. The blocking sleeve 7 has a blocking sleeve wall 12 having an outer wall surface 12a and an inner wall surface 12b, as well as a first blocking sleeve face surface 12c and a second blocking sleeve face surface 12d. The inner contour of the blocking sleeve wall 12, viewed in the direction of the coupling axis 6, from the coupling end 1a toward the connector end 1b, first of all has a first, ring-shaped ball accommodation groove 13a, a ball-locking ring 14 that projects radially inward, a second ring-shaped ball accommodation groove 13b, a circumferential spring accommodation groove 15 that is set back radially outward, as well as an inside thread 16. Thereby a ball accommodation groove 13a; 13b is present on both sides of the ball-locking ring 14.

The connection sleeve 8 (FIG. 1) preferably consists of metal, particularly of machining steel. The connection sleeve 8 has connection sleeve wall 17 having an outer wall surface 17a and an inner wall surface 17b, as well as a first connection sleeve face surface 17c and a second connection sleeve face surface 17d. The outer contour of the connection sleeve wall 17, viewed in the direction of the coupling axis 6, from the coupling end 1a toward the connector end 1b, has a first outside thread 18, a ring 19 that projects radially outward with regard to the outside thread 18, and a second outside thread 20 that is set back radially inward with regard to the ring 19. The inner contour of the connection sleeve wall 17, viewed in the direction of the coupling axis 6, from the coupling end 1a toward the connector end 1b, has a first circular-cylindrical surface section 21, a bearing ring 22 that projects radially inward with regard to the first circular-cylindrical surface section 21, as well as a second circular-cylindrical surface section 23, which is set back radially outward with regard to the bearing ring 22. The bearing ring 22 has a circular-cylindrical ring surface 22a and a ring groove 24 for accommodating a sealing ring 25.

The connector sleeve 9 (FIG. 1) preferably consists of metal, particularly of machining steel. The connector sleeve 9 has a connector sleeve wall 26 having an outer wall surface 26a and an inner wall surface 26b, as well as a first connector sleeve face surface 26c and a second connector sleeve face surface 26d. The outer contour of the connector sleeve wall 26 narrows in the direction of the coupling axis 6, from the coupling end 1a toward the connector end 1b, in step-like manner. At the connector end 1b, the connector sleeve 9 furthermore has a connector piece 27 having an outer thread 28 for connecting a hydraulic line. The connector sleeve 9 can also be structured with any other desired connector form. The inner contour of the connector sleeve wall 26 also narrows in the direction of the coupling axis 6, from the coupling end 1a toward the connector end 1b, in step-like manner. The inner contour, viewed in the direction of the coupling axis 6, from the coupling end 1a toward the connector end 1b, has an inside thread 29, a first circular-cylindrical surface section 30 that projects radially inward with regard to the inside thread 29, and a second circular-cylindrical surface section 31 that projects radially inward with regard to the first circular-cylindrical surface section 30. The second circular-cylindrical surface section 31 is part of the connector piece 27.

In the assembled state of the outer housing part 4a, the blocking sleeve 7 is screwed onto the first outside thread 18 of the connection sleeve 8 with its inside thread 16, to such an extent that the second blocking sleeve face surface 12d lies against the ring 19. The connector sleeve 9 is screwed onto the second outside thread 20 of the connection sleeve 8 with its inside thread 29, to such an extent that the first connector sleeve face surface 26c lies against the ring 19 from the other side. The blocking sleeve 7, the connection sleeve 8, and the connector sleeve 9 are thereby connected with one another in firm but releasable manner, particularly screwed onto one another, and form the outer housing part 4a.

As has already been explained, the inner housing part 4b consists of the valve seat sleeve 10 and the pressure-bearing sleeve 11.

The valve seat sleeve 10 (FIGS. 1-5) preferably consists of metal, particularly of high-strength machining steel. The valve seat sleeve 10 has a valve seat sleeve wall 32 having an outer wall surface 32a and an inner wall surface 32b, as well as a first valve seat sleeve face surface 32c and a second valve seat sleeve face surface 32d. The outer contour of the valve seat sleeve wall 32, viewed in the direction of the coupling axis 6, from the coupling end 1a toward the connector end 1b, has a first circular-cylindrical surface section 33, a second circular-cylindrical surface section 34 that is set back radially toward the inside with regard to the first circular-cylindrical surface section 33, and an outside thread 35. In the region of the first circular-cylindrical surface section 33, the valve seat sleeve 10 furthermore has a circumferential spring accommodation groove 36. The length of the spring accommodation groove 36 corresponds to the length of the spring accommodation groove 15 of the blocking sleeve 7.

The inner contour of the valve seat sleeve wall 32, which forms part of the through-flow channel 5 for the hydraulic medium, viewed in the direction of the coupling axis 6, from the coupling end 1a toward the connector end 1b, or viewed from the first valve seat sleeve face surface 32c toward the second valve seat sleeve face surface 32d, forms an assembly bevel 37 that narrows radially inward, a first circular-cylindrical surface section 38, a conical surface section 39 that narrows radially inward from the coupling end 1a toward the connector end 1b, and a second circular-cylindrical surface section 40. In the region of the second circular-cylindrical surface section 40, the valve seat sleeve 10 furthermore has a ring groove 41 for accommodating a sealing ring 42. The first circular-cylindrical surface section 38, the narrowing or conical surface section 39, and the second circular-cylindrical surface section 40 form an accommodation opening for accommodating the coupling plug of the quick-release coupling according to the invention. Furthermore, the valve seat sleeve wall 32, in the region of the first circular-cylindrical surface section 38 of the inner wall surface 32b, has multiple cylindrical bores 52a that pass through and are adjacent to one another in the circumference direction, which bores serve, in known manner, to accommodate blocking balls 52b.

The second circular-cylindrical surface section 40 is followed, viewed in the direction of the coupling axis 6, from the coupling end 1a toward the connector end 1b, by a ring-shaped, particularly circular-cylindrical, through-flow surface 43, which has a lesser diameter than the second circular-cylindrical surface section 40. As a result, the second circular-cylindrical surface section 40 and the through-flow surface 43 make a transition into one another, by way of a ring-disk-shaped plug contact surface 44, which surface is perpendicular to the coupling axis 6.

The through-flow surface 43, viewed in the direction of the coupling axis 6, from the coupling end 1a toward the connector end 1b, is followed by a conical or cone-shaped valve seat surface 45. The valve seat surface 45 widens, viewed from the coupling end 1a toward the connector end 1b, and has an incline $m_{VS}$. The incline $m_{VS}$ is calculated from the ratio of the amount of the radial length to the amount of the axial length of the valve seat surface 45.

The valve seat surface 45 is followed, viewed in the direction of the coupling axis 6, from the coupling end 1a toward the connector end 1b, according to the invention, by a first conical or cone-shaped transition surface 46a. The first conical transition surface 46a widens, viewed from the coupling end 1a toward the connector end 1b, and has an incline $m_{Ü1}$. The incline $m_{Ü1}$ is calculated from the ratio of the amount of the radial length to the amount of the axial length of the first transition surface 46a. As a result, the flow cross-section or through-flow cross-section of the valve seat sleeve 10 widens directly after the valve seat surface 45. In this connection, the following preferably holds true: $m_{Ü1} > m_V$. As a result, turbulence is reduced. The angle $\alpha_{Ü1}$ (FIG. 3), which the first transition surface 46a encloses with the coupling axis 6, preferably amounts to 50 to 60°, in this connection.

The first conical transition surface 46a, viewed in the direction of the coupling axis 6, from the coupling end 1a toward the connector end 1b, is followed by a circular-cylindrical excavation surface or flow surface or expansion surface 47. The expansion surface 47, viewed in the direction of the coupling axis 6, from the coupling end 1a toward the connector end 1b, is followed by a second conical or cone-shaped transition surface 46b. The second conical transition surface 46b narrows, viewed from the coupling end 1a toward the connector end 1b, and has an incline $m_{Ü2}$. The incline $m_{Ü2}$ is calculated from the ratio of the radial length to the axial length of the second transition surface 46b. In this connection, it preferably holds true that: $m_{Ü1} > m_{Ü2}$.

The angle $\alpha_{Ü2}$ (FIG. 3), which the valve seat surface 45 encloses with the coupling axis 6, preferably amounts to 35 to 45°, in this connection. The total length L (FIG. 5), in other words the expanse in the axial direction, of the first transition surface 46a, the expansion surface 47, and the second transition surface 46b, together, preferably amounts to at least 7 mm, particularly at least 8 mm.

Figure 2:
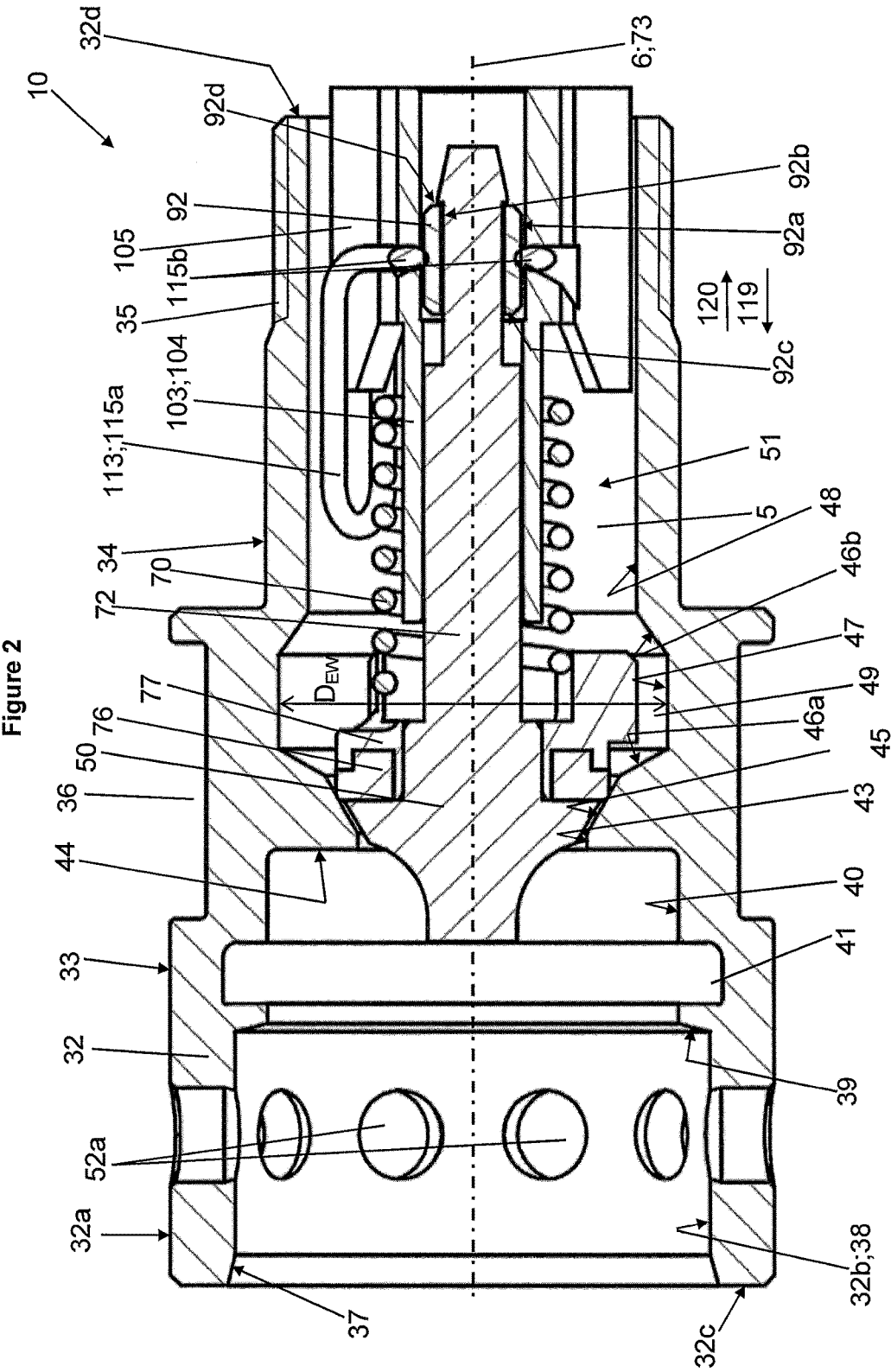
FIG. 2 is a longitudinal section through a valve sleeve of the coupling cuff, with the closing valve in the closed position, with a one-part bearing sleeve.
Figure 3:
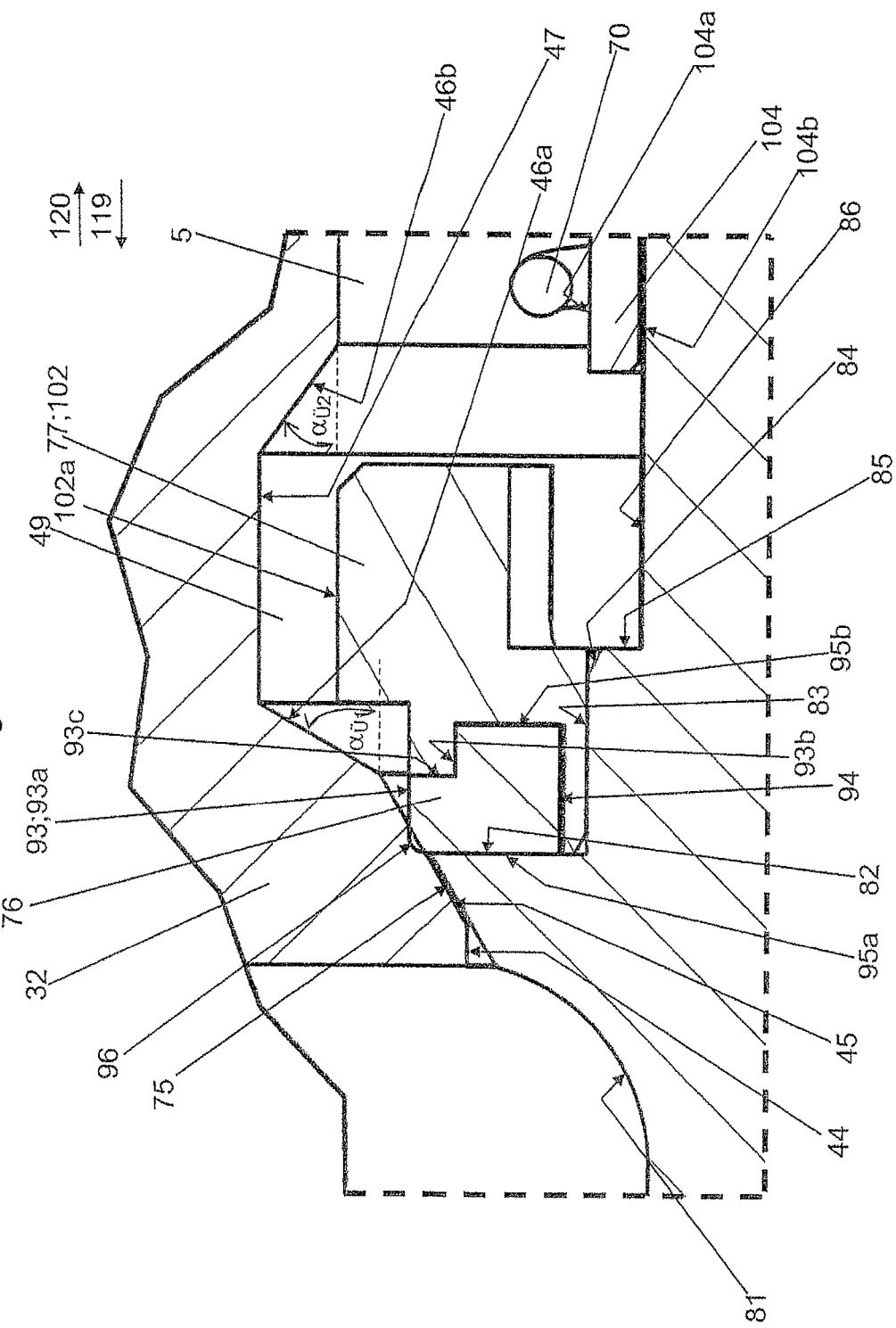
FIG. 3 is a magnified representation of the region of the valve seat from FIG. 2.

The second transition surface 46b, viewed in the direction of the coupling axis 6, from the coupling end 1a toward the connector end 1b, is followed by a circular-cylindrical valve guide surface 48. The circular-cylindrical valve guide surface 48 serves to guide or provide sliding support for a closing valve 50 of a valve device 51, which will be discussed in greater detail below. The diameter of the valve guide surface 48 is greater than the diameter of the through-flow surface 43 but less than the diameter of the expansion surface 47. As a result, the first transition surface 46a, the expansion surface 47, and the second transition surface 46b form a ring-shaped or circumferential or groove-shaped cross-sectional widened region 49 of the through-flow cross-section or of the through-flow channel 5. As a result, the cross-section of the through-flow channel 5 widens radially outward in the region of the cross-sectional widened region 49. In this connection, the cross-sectional widened region 49 has a trapezoid cross-section. The expansion surface 47 of the cross-sectional widened region 49 furthermore has an expansion diameter $D_{EW}$ (FIG. 2).

The pressure-bearing sleeve 11 (FIG. 1) preferably consists of metal, particularly of machining steel. The pressure-bearing sleeve 11 has a pressure-bearing sleeve wall 53 having an outer wall surface 53a and an inner wall surface 53b, as well as a first pressure-bearing sleeve face surface 53c and a second pressure-bearing sleeve face surface 53d. The outer contour of the pressure-bearing sleeve wall 53, viewed in the direction of the coupling axis 6, from the coupling end 1a toward the connector end 1b, has a first circular-cylindrical surface section 54, a ring groove 55 for accommodating a sealing ring 56, a second circular-cylindrical surface section 57, a third circular-cylindrical surface section 58, a ring groove for accommodating a sealing ring 60, and a fourth circular-cylindrical surface section 61. In this connection, the diameter of the second circular-cylindrical surface section 57 is greater than the diameter of the third circular-cylindrical surface section 58, so that these sections make a transition into one another by way of a step.

The inner contour of the pressure-bearing sleeve wall 53, viewed in the direction of the coupling axis 6, from the coupling end 1a toward the connector end 1b, has a first circular-cylindrical surface section 62, an inside thread 63, a second circular-cylindrical surface section 64, a third circular-cylindrical surface section 65, and a fourth circular-cylindrical surface section 66. In this connection, the diameter of the second circular-cylindrical surface section 64 is greater than the diameter of the third circular-cylindrical surface section 65, and the diameter of the third circular-cylindrical surface section 65 is greater than the diameter of the fourth circular-cylindrical surface section 66, so that the individual surface sections 64; 65; 66 make a transition into one another, in each instance, by way of a step surface 67; 68 in the shape of a ring disk.

In the assembled state of the inner housing part 4b (FIG. 1), the pressure-bearing sleeve 11 is screwed onto the outside thread 35 of the valve seat sleeve 10, with its inside thread 63, to such an extent that the first step surface 67 lies against the second valve seat sleeve face surface 32d. The pressure-bearing sleeve 11 and the valve seat sleeve 10 are thereby connected with one another in firm but releasable manner, and form the inner housing part 4b.

As has already been explained, in the assembled state of the coupling cuff 2 (FIG. 1), the inner housing part 4b is mounted so as to be displaceable or relocatable, back and forth, by a limited amount, against the force of a locking spring 69, in a direction parallel to the coupling axis 6. The inner housing part 4b is therefore mounted in the outer housing part 4a so as to slide. For this purpose, the valve seat sleeve 10 lies against the inner wall surface 12b; 17b of the blocking sleeve 7 and of the connection sleeve 8, so as to slide, with its outer wall surface 32a, in multiple regions. And the pressure-bearing sleeve 11 lies against the inner wall surface 17b; 26b of the connection sleeve 8 and of the connector sleeve 9, so as to slide, with its outer wall surface 32a. Furthermore, the two spring accommodation grooves 15; 36 of the blocking sleeve 7 and of the valve seat sleeve 10 are disposed adjacent to one another, in the radial direction, wherein the locking spring 69 is disposed and compressed within the two spring accommodation grooves 15; 36. As a result, the inner housing part 4b can be displaced only in a direction parallel to the coupling axis 6 against the force of the locking spring 69. In the uncoupled starting position shown in FIG. 1, the ball locking ring 14 is furthermore disposed to lie opposite the bores 52a that contain the blocking balls 52b, in the radial direction. As a result, the blocking balls 52b project into the through-flow channel 5.

As has already been explained, a valve device 51 having a tappet-like closing valve or valve tappet 50 (FIG. 1-6) for closing off the through-flow channel 5 in the uncoupled state of the coupling cuff 2 is disposed within the inner housing part 4b. The valve device 51 has the closing valve 50, a closing spring 70, as well as means for axially displaceable mounting of the closing valve 50 and a locking device for locking the closing valve 50 in its maximally or completely open position.

The closing valve 50 has a valve head 71, an elongated valve stem 72, as well as the longitudinal valve axis 73, which is coaxial to the coupling axis 6. Viewed in the direction of the longitudinal valve axis 73, the closing valve 50 has a first, head-side valve end 50a, and a second valve end 50b. The valve head 71, which is particularly mushroom-shaped, has an opening projection 74 that projects in the direction of the longitudinal valve axis 73, to open the closing valve 50, as well as a conical surface 75 and a valve sealing ring 76 for sealing contact against the conical valve seat surface 45 of the valve seat sleeve 10. Furthermore, the valve head 71 preferably has a chambering and guide sleeve 77, for chambering, particularly metallic chambering, of the valve sealing ring 76.

In this connection, the closing valve 50 particularly has a basic valve body 78, which preferably consists of metal, particularly of machining steel. The basic valve body 78 has a head part 79 as well as the valve stem 72 that follows the head part 79. The head part 79 forms part of the valve head 71 and has an outer head part surface 79a.

The head part 79, viewed from the first valve end 50a toward the second valve end 50b, first has the opening projection 74 and then the conical surface 75. The opening projection 74 has an abutment surface 80 that is particularly level and perpendicular to the longitudinal valve axis 73, and an outer projection wall 81 that is particularly arched in concave shape and widens toward the second valve end 50b. The abutment surface 80 and the outer projection wall 81 are part of the outer head part surface 79a. The outer projection wall 81 is followed by the conical surface 75 that widens toward the second valve end 50b. Furthermore, the outer head part surface 79a, viewed from the first valve end 50a toward the second valve end 50b, has a ring-disk-shaped sealing ring contact surface 82, a circular-cylindrical bearing surface 83, an assembly bevel 84, and a ring-disk-shaped collar surface 85. The conical surface 75 and the circular-cylindrical bearing surface 83 make a transition into one another by way of the sealing ring contact surface 82, wherein the diameter of the circular-cylindrical bearing surface 83 is less than the greatest diameter of the conical surface 75. Furthermore, the sealing ring contact surface 82 is preferably perpendicular to the longitudinal valve axis 73.

The circular-cylindrical valve stem 72 follows the collar surface 85, standing away from it. The valve stem 72 has an outer body surface 72a. The outer body surface 72a, viewed from the first valve end 50a toward the second valve end 50b, has a circular-cylindrical bearing sleeve guide surface 86, a first ring-disk-shaped counter-bearing surface 87a, a circular-cylindrical sliding sleeve guide surface 88, a second ring-disk-shaped counter-bearing surface 87b, as well as a body end surface 89, which narrows toward the second valve end 50b, and a body face surface 90.

In this connection, the diameter of the bearing sleeve guide surface 86 is greater than the diameter of the sliding sleeve guide surface 88. And the greatest diameter of the body end surface 89 is also greater than the diameter of the sliding sleeve guide surface 88. As a result, a sliding sleeve guide groove 91 is formed by the sliding sleeve guide surface 88 and the two counter-bearing surfaces 87a; 87b, to guide a sliding sleeve 92 so as to be displaceable by a limited amount.

The valve sealing ring 76 consists of a rubber-elastic material or plastic, particularly of a nitrile/butadiene rubber, PTFE (polytetrafluoroethylene) or polyurethane. Furthermore, the valve sealing ring 76 has a circumferential outer ring surface 93, a circumferential, circular-cylindrical inner ring surface 94, as well as two ring face surfaces 95a; 95b that lie opposite one another in a direction parallel to the coupling axis 6. The two level ring face surfaces 95a; 95b are perpendicular to the longitudinal valve axis 73.

The outer ring surface 93 is furthermore configured to be stepped, and has a first and a second ring circumference surface 93a; 93b, each circular-cylindrical. In this connection, the diameter of the first ring circumference surface 93a is greater than the diameter of the second ring circumference surface 93b. Furthermore, the first ring circumference surface 93a faces the first valve end 50a, and the second ring circumference surface 93b faces the second valve end 50b.

The first and second ring circumference surface 93a; 93b make a transition into one another by way of a ring-disk-shaped contact surface 93c of the outer ring surface 93, which contact surface is perpendicular to the coupling axis 6. Furthermore, the first ring circumference surface 93a and the first ring face surface 95a make a transition into one another by way of a circumferential, particularly a rounded-off ring sealing edge 96, which serves for contact against the valve seat surface 45.

The chambering and guide sleeve 77 preferably consists of metal, particularly of steel, or of plastic. The chambering and guide sleeve 77 is preferably configured in one piece or in a hybrid construction, and has a ring disk 97 having a circumferential and circular-cylindrical disk circumference surface 97a, a circumferential and circular-cylindrical inner disk surface 97b, as well as two disk face surfaces 97c; 97d that lie opposite one another in a direction parallel to the coupling axis 6.

The diameter of the inner disk surface 97b corresponds to the diameter of the circular-cylindrical bearing surface 83 of the basic valve body 78. The first disk face surface 97c is particularly configured to be level and perpendicular to the coupling axis 6.

Figure 7:
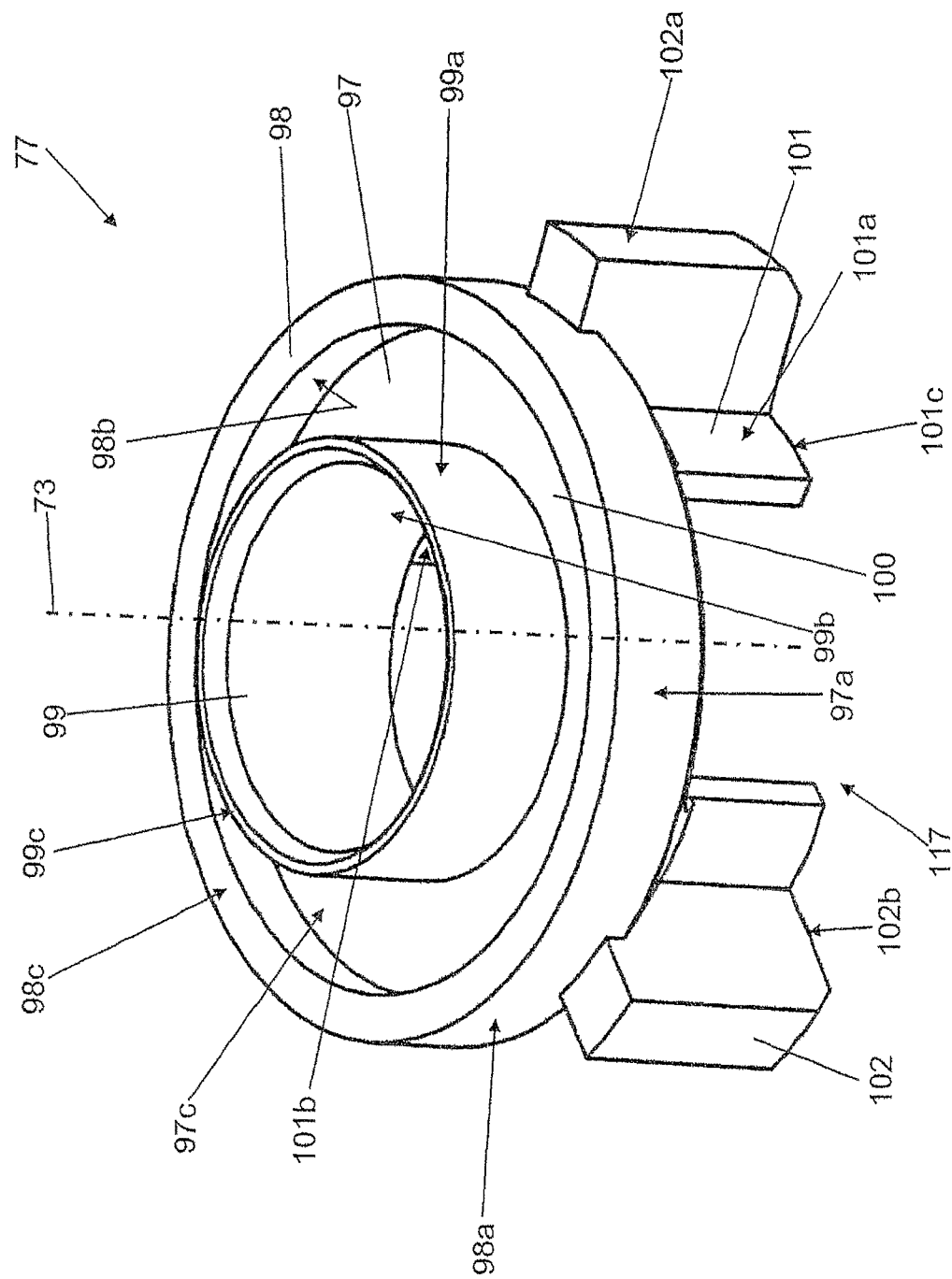
FIG. 7 is a perspective view of a chambering and guide sleeve.
Figure 8:
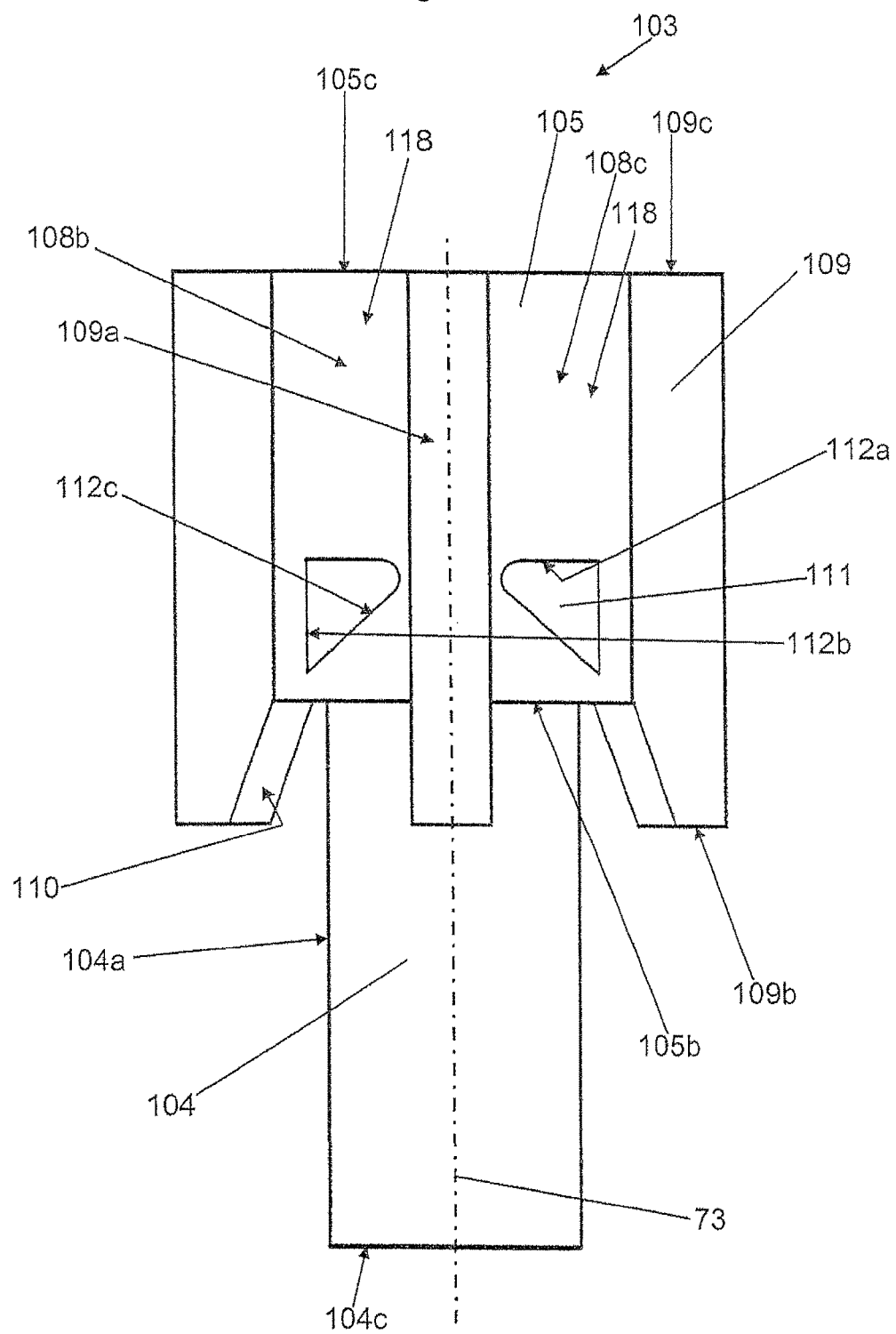
FIG. 8 is a side view of a bearing sleeve.
Figure 9:
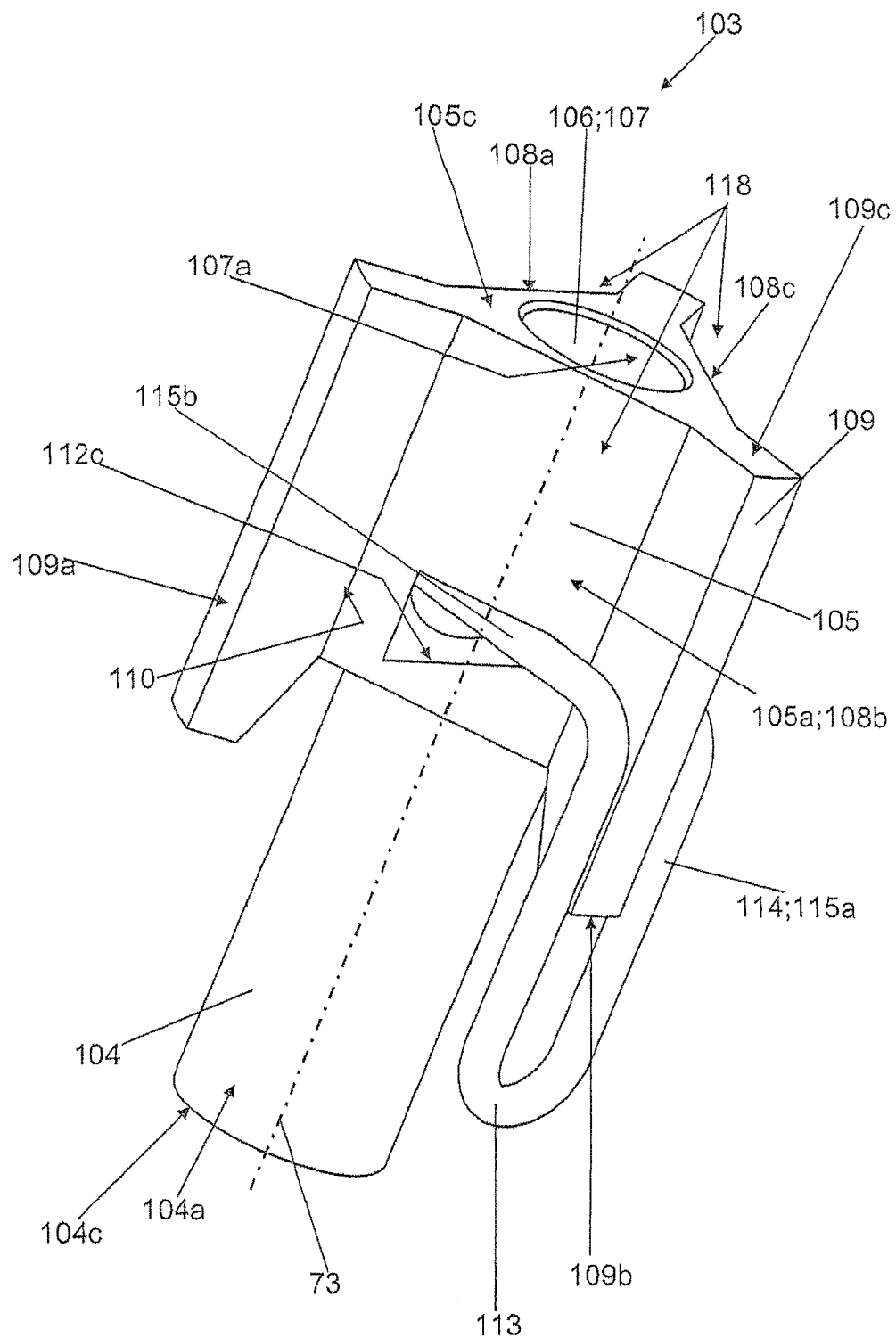
FIG. 9 is a perspective view of the bearing sleeve with a spring clamp.

Furthermore, the chambering and guide sleeve 77 has a ring collar 98 that projects away from the first disk face surface 97c in the axial direction. As shown in FIG. 7, the ring collar 98 has a circular-cylindrical outer collar surface

98a and a circular-cylindrical inner collar surface 98b, as well as a collar face surface 98c, which is particularly level and perpendicular to the longitudinal valve axis 6.

The diameter of the outer collar surface 98a corresponds to the diameter of the disk circumference surface 97a, so that these form a consistent, circular-cylindrical surface. Furthermore, the diameter of the outer collar surface 98a corresponds to the diameter of the first ring circumference surface 93a of the valve sealing ring 76. The diameter of the inner collar surface 98b corresponds to the diameter of the second ring circumference surface 93b of the valve sealing ring 76.

Furthermore, the chambering and guide sleeve 77 has a ring bearing bushing 99 for mounting the valve sealing ring 76, which bushing also projects away from the first disk face surface 97c. The ring bearing bushing 99 has a bushing circumference surface 99a, an inner bushing surface 99b, as well as a bushing face surface 99c, particularly a level surface, which is perpendicular to the coupling axis 6. The diameter of the inner bushing surface 99b corresponds to the diameter of the inner disk surface 97b, so that these surfaces form a consistent, circular-cylindrical surface. The bearing bushing 99 projects beyond the ring collar 98, viewed in a direction parallel to the longitudinal valve axis 73, in other words projects away from the first disk face surface 97c farther than the ring collar 98. Furthermore, a ring-shaped sealing ring accommodation groove 100 is formed between the inner collar surface 98b and the bushing circumference surface 99a, to accommodate the valve sealing ring 76.

The chambering and guide sleeve 77 serves not only for chambering of the valve sealing ring 76, but also for mounting or guiding the closing valve 50 in the valve seat sleeve 10 so as to slide. For this purpose, the chambering and guide sleeve 77 furthermore has multiple, particularly three, cylinder pipe segments 101, which project from the second disk face surface 97d in the axial direction. The cylinder pipe segments 101, viewed in the circumference direction of the ring disk 97, are distributed uniformly and disposed adjacent to one another. The cylinder pipe segments 101 each have an outer pipe surface 101a and an inner pipe surface 101b, as well as a free pipe face surface 101c. In this connection, the diameter of the inner pipe surfaces 101b is preferably greater than the diameter of the inner disk surface 97b. The diameter of the outer pipe surfaces 101a is furthermore preferably smaller than the diameter of the disk circumference surface 97a.

Furthermore, the chambering and guide sleeve 77 has multiple blade-like guide crosspieces 102, wherein one of the guide crosspieces 102, in each instance, projects away outward in the radial direction from the outer pipe surface 101a of a cylinder pipe segment 101. Furthermore, the guide crosspieces 102 have a longitudinal expanse parallel to the longitudinal valve axis 73. The guide crosspieces 102 also each have a concave, arched outer crosspiece surface 102a, the diameter of which corresponds to the diameter of the valve guide surface 48 of the valve seat sleeve 10. Furthermore, they have a free crosspiece face surface 102b, which particularly ends flush with the respective pipe face surface 101c. A through-flow slot or a through-flow gap or a through-flow groove 117 is formed between two guide crosspieces 102 that are adjacent to one another in the circumference direction, in each instance, through which slot/gap/groove the hydraulic medium can flow in the axial direction.

In the assembled state of the closing valve 50, the ring bearing bushing 99 and the ring disk 97 are disposed around the circular-cylindrical bearing surface 83 of the head part 79. In particular, the inner disk surface 97b and the inner bushing surface 99b lie against the circular-cylindrical bearing surface 83. A press fit exists between the inner disk surface 97b and the inner bushing surface 99b as well as the circular-cylindrical bearing surface 83. The chambering and guide sleeve 77 and the basic valve body 78 are thereby firmly connected with one another, particularly by means of a press fit. The chambering and guide sleeve 77 thereby particularly forms a part of the valve head 71. Furthermore, the bushing face surface 99c lies against the sealing ring contact surface 82.

Furthermore, the valve sealing ring 76 is disposed or chambered between the chambering and guide sleeve 77 and the head part 79 of the basic valve body 78. The valve sealing ring 76 is disposed between the chambering and guide sleeve and the head part 79 with a shape bond, and is held by these parts so as to be non-displaceable in the axial and radial direction. For this purpose, the first ring face surface 95a lies against the sealing ring contact surface 82, and the second ring face surface 95b lies against the first disk face surface 97c. Furthermore, the inner ring surface 94 lies against the bushing circumference surface 99a, the second ring circumference surface 93b lies against the inner collar surface 98b, and the contact surface 93c lies against the collar face surface 98c. As a result, the valve sealing ring 76 is chambered and protected against the flowing hydraulic medium. The valve sealing ring 76 also particularly forms a part of the valve head 71.

Because the diameter of the first ring circumference surface 93a corresponds to the diameter of the outer collar surface 98a, the first ring circumference surface 93a and the outer collar surface 98a are flush with one another in the radial direction. Furthermore, they, and, as a result, also the ring sealing edge 96, project slightly beyond the conical surface 75 in the radial direction. In this way, it is guaranteed that in the closed state of the closing valve 50, the valve sealing ring 76 is elastically deformed when it is pressed against the valve seat surface 45. In this way, a good sealing effect is achieved. The diameter of the first ring circumference surface 93a is also referred to as the valve sealing diameter $D_{VD}$.

The valve device 51 furthermore has a bearing sleeve 103 (FIG. 1, 2, 4, 8, 9) for displaceable mounting of the closing valve 50. The bearing sleeve 103 also preferably consists of metal, particularly of steel, or of a metal/plastic combination. It also serves for displaceable mounting of the closing valve 50 within the valve seat sleeve 10. The second bearing sleeve 103 has a guide pipe 104 having a circular-cylindrical outer pipe surface 104a and a circular-cylindrical inner pipe surface 104b, as well as a free, ring-shaped pipe face surface 104c.

Furthermore, the bearing sleeve 103 has a guide body 105. The guide body 105 has a recess 106, which passes through the guide body 105 in the direction of the longitudinal valve axis 73, the diameter of which recess corresponds to the diameter of the inner pipe surface 104b. Therefore the bearing sleeve 103 has a bearing recess 107 that passes through the bearing sleeve 103 in the axial direction, having a circular-cylindrical recess wall 107a.

Furthermore, the guide body 105 has an outer guide body surface 105a as well as a first and second guide body face surface 105b; 105c. The guide pipe 104 follows the first guide body face surface 105b and projects away from the first guide body face surface 105b in the axial direction. The guide body 105 furthermore preferably has a triangular cross-section. Cross-section means a section perpendicular to the longitudinal valve axis 73. As a result, the outer guide body surface 105a consists of three surface sections 108a;

108b; 108c that lie adjacent to one another in pairs and are each preferably level, and particularly enclose an angle of 60° with one another.

The guide body 105 furthermore has multiple, particularly three, blade-like guide strips 109. The guide strips 109 project away outward from the outer guide body surface 105a in the radial direction with reference to the longitudinal valve axis 73, in each instance. The guide strips 109 are distributed uniformly, viewed in the circumference direction with reference to the longitudinal valve axis 73. A through-flow slot or a through-flow gap or a through-flow groove 118 is formed between two guide strips 109 that are adjacent to one another in the circumference direction, in each instance, through which slot/gap/groove the hydraulic medium can flow in the axial direction.

In particular, the guide strips 109 are each disposed in an edge region at which two surface sections 108a; 108b; 108c would intersect, in each instance. Furthermore, the guide strips 109 each have an arched outer strip surface 109a as well as a first and second strip face surface 109b; 109c. In this connection, the diameter of the outer strip surfaces 109a corresponds to the diameter of the valve guide surface 48 of the valve seat sleeve 10. Furthermore, the guide strips 109 have a longitudinal expanse in the axial direction. In this connection, the two guide strip face surfaces 109c all end flush with the second guide body face surface 105c. The guide strips 109 furthermore preferably project beyond the first guide body face surface 105b in the axial direction. Slanted connection surfaces 110 connect the first strip face surfaces 109b with the first guide body face surface 105b.

The guide body 105 furthermore has two clamp accommodation recesses 111 that pass through the guide body 105. The clamp accommodation recesses 111 preferably both extend through the guide body 105 in the same direction, which is perpendicular to the longitudinal valve axis 73. In this connection, the clamp accommodation recesses 111 extend through the guide body 105 on both sides of the longitudinal valve axis 73. In particular, the one of the two clamp accommodation recesses 111 extends from the first surface section 108a to the second surface section 108b that lies adjacent to it, and the other of the two clamp accommodation recesses 111 proceeds from the first surface section 108a but opens to the outside at the third surface section 108c.

In this connection, the clamp accommodation recesses 111 have a triangular cross-section. In particular, the clamp accommodation recesses 111 are delimited by three recess walls 112a; 112b; 112c that lie adjacent to one another in pairs. The first recess wall 112a preferably extends perpendicular to the longitudinal valve axis 73. The second recess wall 112b extends parallel to the longitudinal valve axis 73, and the third recess wall 112c extends from the first recess wall 112a at a slant outward, in other words away from the longitudinal valve axis 73, and toward the pipe face surface 104c or the first guide body face surface 105b. The two clamp accommodation recesses 111 are thereby configured symmetrical to a plane that contains the longitudinal valve axis 73.

The valve device 51 has a spring clamp 113, preferably U-shaped, to lock the closing valve 50 in its maximally open position. The spring clamp 113 has two spring arms 114 that are connected with one another and parallel to one another. The spring arms 114 are configured to be angled away, in each instance, and have a base shank 115a and a clamping shank 115b. The base shank 115a and the clamping shank 115b of a spring arm 114 are angled away from one another.

Furthermore, the two base shanks 115a are connected with one another. The spring clamp 113 preferably consists of metal.

As has already been explained, the valve device 51 furthermore has the sliding sleeve 92 for locking the closing valve 50 in its maximally open position. The sliding sleeve 92, which particularly consists of plastic, has a circular-cylindrical outer sliding sleeve surface 92a, a circular-cylindrical inner sliding sleeve surface 92b, as well as a first and a second sliding sleeve face edge 92c; 92d. In this connection, the diameter of the outer sliding sleeve surface 92a corresponds to the diameter of the recess wall 107a of the bearing recess 107. And the diameter of the inner sliding sleeve surface 92b corresponds to the diameter of the sliding sleeve guide surface 88 of the valve stem 72.

In the assembled state of the valve device 51 (FIG. 1, 2, 4), the sliding sleeve 92 is guided so as to be displaceable back and forth in the sliding sleeve guide groove 91 of the valve stem 72, in the direction of the longitudinal valve axis 73, by a limited amount. The mobility of the sliding sleeve 92 is limited by the two counter-bearing surfaces 87a; 87b.

Furthermore, the valve stem 72 is guided within the bearing sleeve 103, particularly on the bearing sleeve guide surface 86, so as to be displaceable back and forth in the direction of the longitudinal valve axis 73. As a result, the sliding sleeve 92 is disposed within the bearing sleeve 103, particularly in the region of the guide body 105, wherein the recess wall 107a of the bearing recess 107 lies against the outer sliding sleeve surface 92a. The two clamping shanks 115b of the spring clamp 113 are furthermore passed through the clamp accommodation recesses 111, proceeding from the second or third surface section 108b; 108c. The two base shanks 115a extend along the guide pipe 104 toward the pipe face surface 104c. In the non-coupled state, in other words in the closed position of the closing valve 50 (FIG. 1, 2, 3), the two clamping shanks 115b engage around the sliding sleeve 92. The two clamping shanks 115b are pressed against the outer sliding sleeve surface 92a by means of spring force.

Furthermore, the outer strip surfaces 109a lie against the valve guide surface 48 of the valve seat sleeve 10 with a shape bond. Because of the through-flow grooves 118, channel-like interstices are formed between the individual guide strips 109 and the valve guide surface 48, so that hydraulic medium can flow through. Furthermore, the second strip face surfaces 109c lie against the second step surface 68 of the pressure-bearing sleeve 11. As a result, movement of the second bearing sleeve 103 in the direction toward the connector end 1b is blocked.

The closing spring 70, which is preferably a helical spring, is disposed around the valve stem 72 and the guide pipe 104 of the bearing sleeve 103. It supports itself on the valve head 71 at the one end, particularly on the chambering and guide sleeve 77, and on the bearing sleeve 103 at the other end. In particular, the closing spring 70 is disposed between the cylinder pipe segments 101 of the chambering and guide sleeve 77 at the one end, and supports itself on the second disk face surface 97d. Furthermore, the closing spring 70 is disposed between the guide strips 109 at the other end, and supports itself on the first guide body face surface 105b. As a result, the closing spring 70 forces the chambering and guide sleeve 77 and the bearing sleeve 103 apart from one another. Or the closing spring 70 forces the valve head 71 toward the valve seat surface 45. Or the closing spring 70 drives the closing valve 50 in a valve closing direction 119.

Moreover, the outer crosspiece surfaces 102 of the guide crosspieces 102 lie against the valve guide surface 48 of the valve seat sleeve 10 and are guided so as to slide there. Because of the through-flow grooves 117, flow channels are formed between the individual guide crosspieces 102, the outer valve stem surface 72a, and the valve guide surface 48, for the hydraulic medium to flow through.

In the closed position of the closing valve 50 (FIG. 1-3), the ring sealing edge 96 of the valve sealing ring 76 lies against the valve seat surface 45, forming a seal, or is pressed against it, wherein the valve sealing ring 76 is elastically deformed. The valve sealing ring is maximally deformed to such an extent that the conical surface 75 also lies against the valve seat surface 45. In this position, no hydraulic medium can flow through the coupling cuff 2.

Opening of the closing valve 50 takes place as follows:

During the plug-in coupling process, which particularly takes place with the coupling cuff 2 not under pressure, a coupling plug (not shown) is inserted into the coupling cuff 2 in known manner, particularly until it makes contact with the plug contact surface 44. The coupling plug also has a coupling housing having a closing valve. During insertion, the inner housing part 5 is displaced toward the connector end 1b, counter to the force of the locking spring 69, so that the blocking balls 52b can escape radially outward into the second ball accommodation groove 13b. As a result, the coupling plug can be pushed further, until it comes to a stop. The inner housing part 5 is subsequently displaced back into its starting position by the force of the locking spring 69, so that the blocking balls 52b engage into a locking groove or the like of the coupling plug, locking it in place, in known manner. The two coupling parts are then locked into one another.

Figure 4:
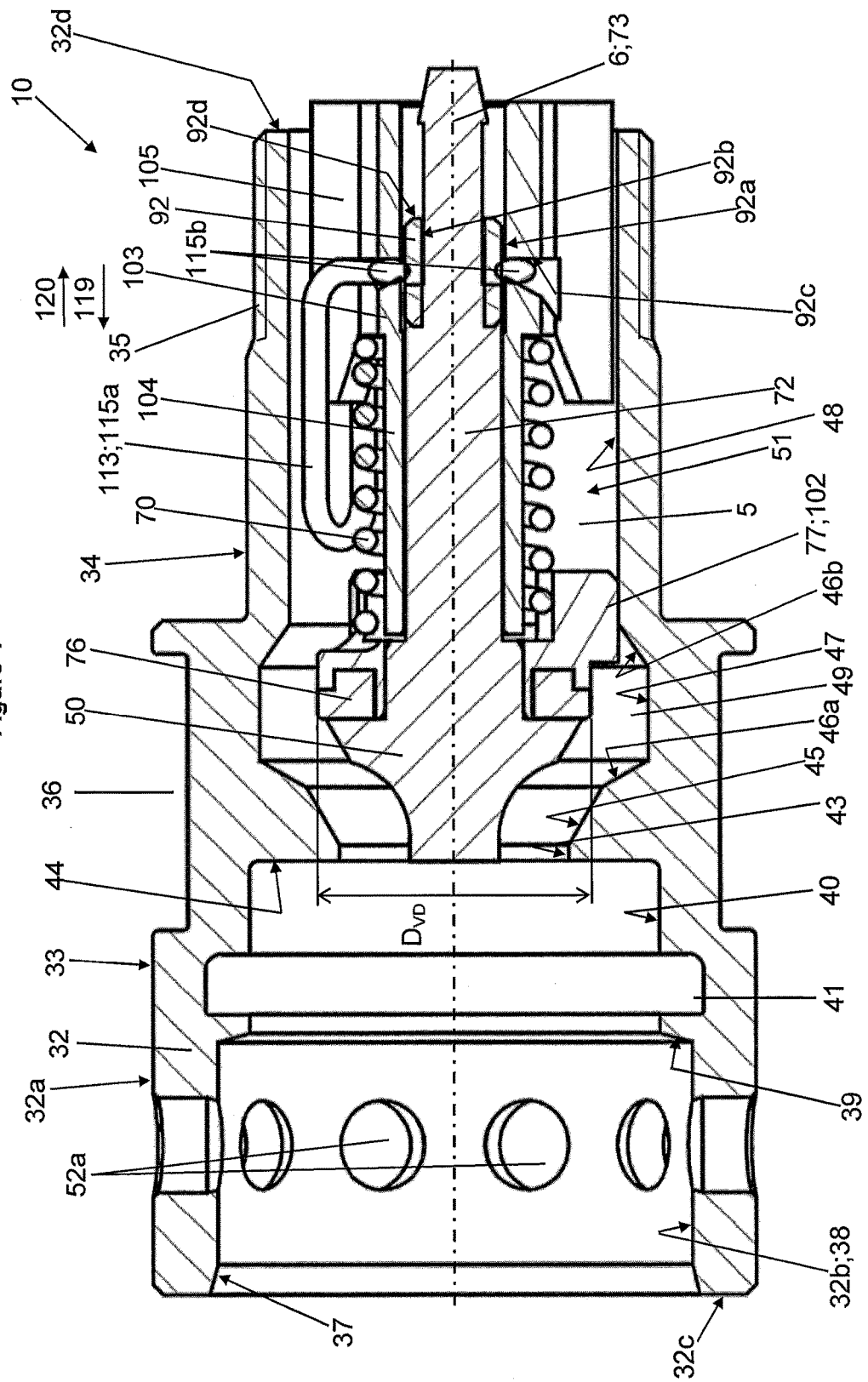
FIG. 4 is a longitudinal section through the valve seat sleeve, with the closing valve in the maximally open position.

During the coupling process, the two abutment surfaces 80 of the valve heads 71 furthermore make contact with one another, so that the closing valves 50 are automatically lifted from the valve seat surface 45 counter to the force of the closing spring 70. They are displaced in a valve opening direction 120 opposite to the valve closing direction 119. The closing valve 50 is moved toward the respective connector end 1b, wherein the second bearing sleeve 103 remains fixed in place. In this connection, the clamping shanks 115b slide along the sliding sleeve 92, on the outside, toward the first sliding sleeve face edge 92c, and slip down from the sliding sleeve 92. The clamping shanks 115b then engage into the sliding sleeve guide groove 91 between the first counter-bearing surface 87a and the first sliding sleeve face edge 92c. As a result, the closing valve 50 cannot be moved any further toward the connector end 1b in the valve opening direction 120. The closing valve 50 is locked in its maximally open position (FIG. 4). In particular, the closing valve 50 is locked in such a manner that it is non-displaceable in the valve opening direction 120.

Figure 5:
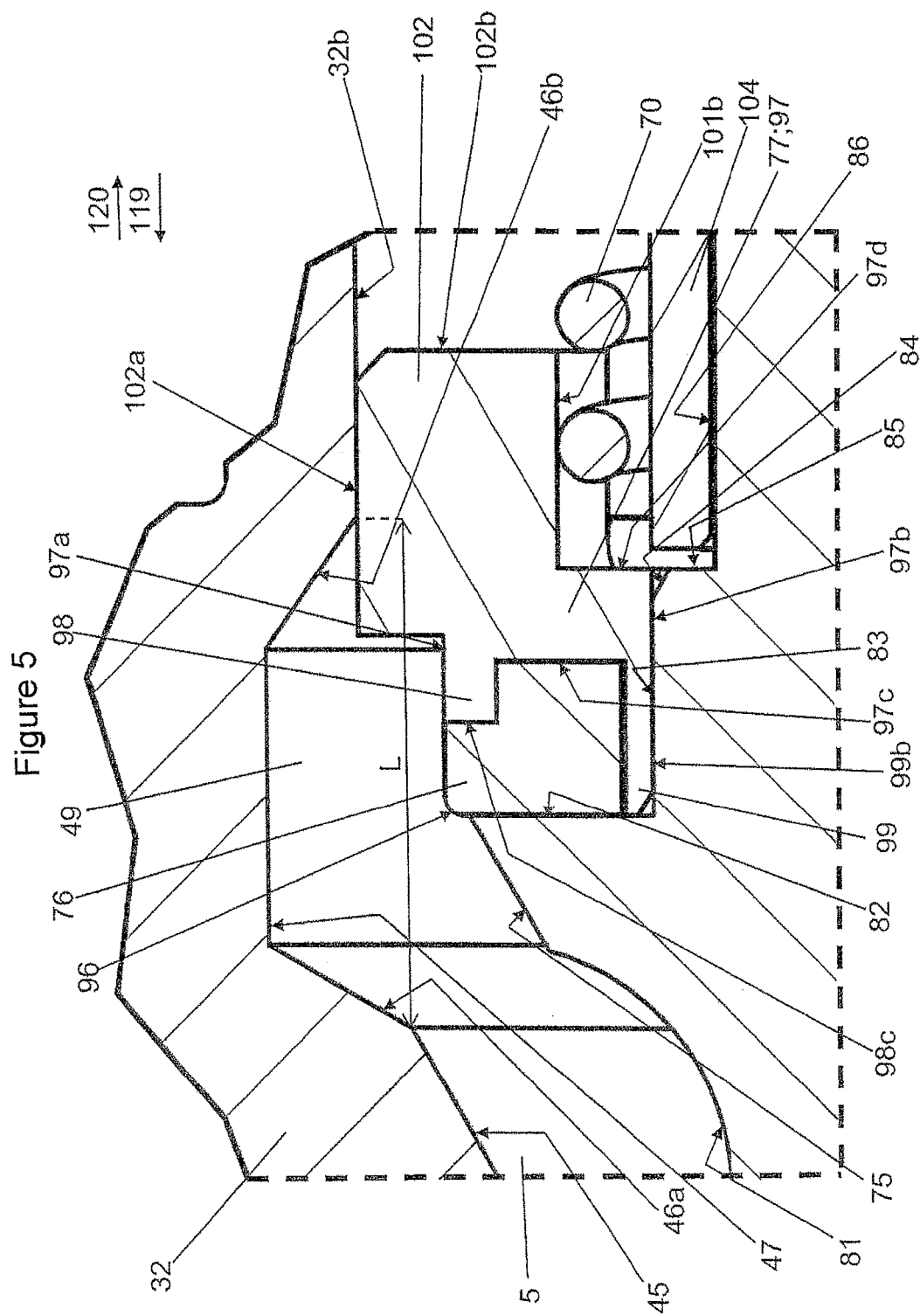
FIG. 5 is a magnified representation of the region of the valve seat from FIG. 4.
Figure 6:
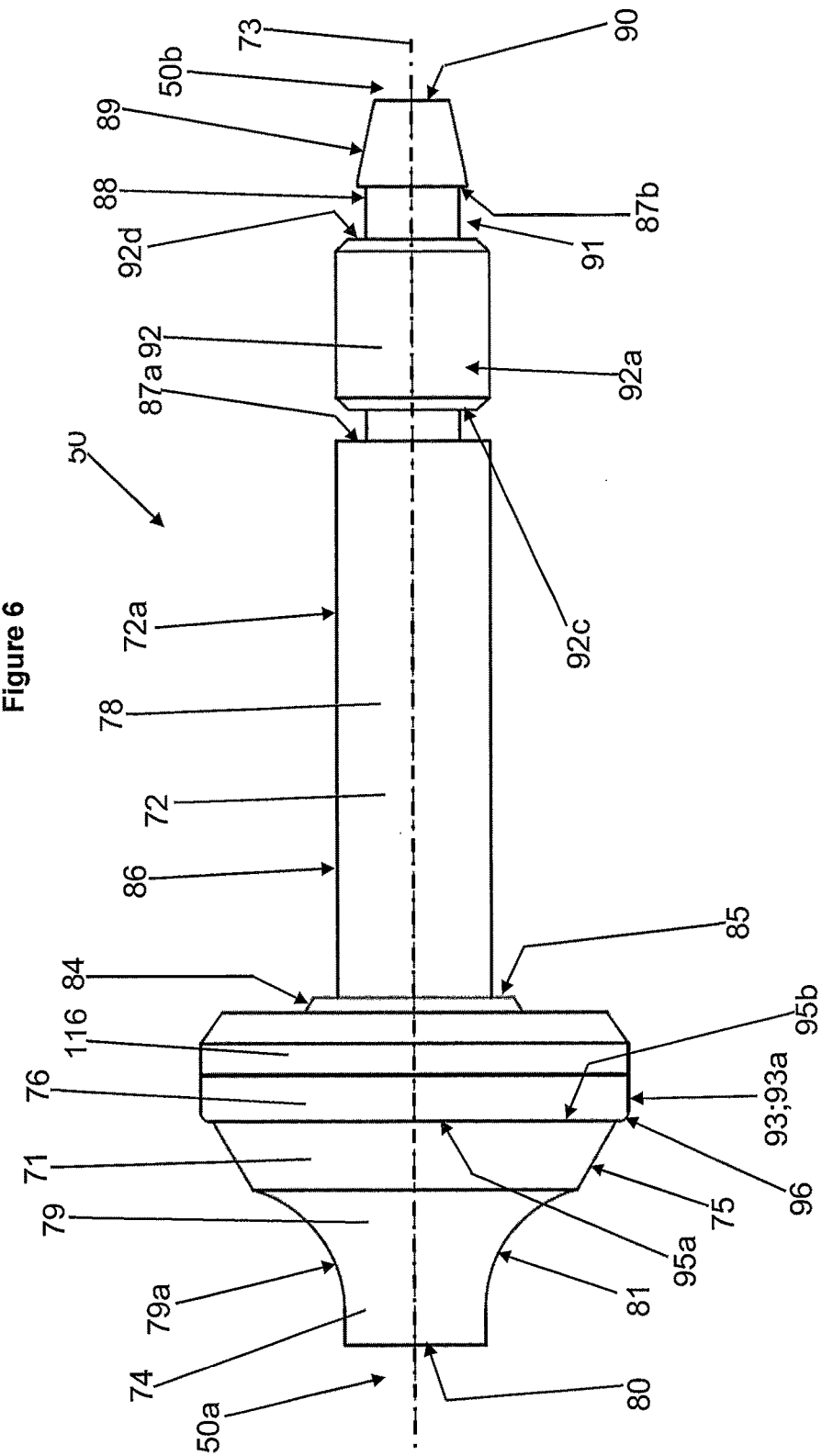
FIG. 6 is a side view of the closing valve, with a valve sealing ring, a chambering sleeve according to the state of the art, and a sliding sleeve.

As can particularly be seen in FIGS. 4 and 5, the first ring circumference surface 93a is disposed lying radially opposite the cross-sectional widened region 49 in the maximally open and locked position of the closing valve 50. As a result, according to the invention, large through-flow amounts of at least 240 L/min are easily possible with the maximally open closing valve 50. In this connection, it was found, according to the invention, that the ratio of expansion diameter $D_{EW}$ to a valve sealing diameter $D_{VD}$ (FIG. 4) is particularly important. According to the invention, the ratio $D_{EW}/D_{VD}$ lies at 1.35 to 1.6, preferably at 1.4 to 1.45. In this connection, the valve sealing diameter $D_{VD}$ preferably amounts to 13.2 to 13.7 mm, at this construction size of the coupling. And the expansion diameter $D_{EW}$ preferably amounts to 19.5 to 20 mm. The ratio $D_{EW}/D_{VD}$ can also be used, however, for other dimensions of plug-in couplings.

During uncoupling, when the two coupling parts 1; 2 are pulled apart from one another once again, the closing valves 50 are automatically moved into their closed position by the force of the closing springs 70. In this connection, the clamping shanks 115b slide along the slanted recess walls 112a of the clamp accommodation recesses 111, and are thereby forced apart from one another. As a result, the clamping shanks 115b slide back up onto the sliding sleeve 92 and along the outer sliding sleeve surface 92a.

It is an advantage of the quick-release coupling according to the invention that because of the cross-sectional widened region 49 and, in particular, because of the dimensions of the valve sealing ring 76 and, of the cross-sectional widened region 49, which are coordinated with one another, it is suitable for an increased through-flow volume of at least 240 L/min. In this connection, the construction length of the known coupling part did not need to be lengthened. Also, the outside dimensions were maintained. The geometries of the through-flow channel 5 and of the valve sealing ring 76 were optimized and coordinated with one another. The trapezoid cross-sectional widened region 49 is particularly advantageous, in this connection, because this flow-optimized contour minimizes the turbulent flow that occurs at this high through-flow volume of 240 L/min. The cross-sectional widened region 49 can also have a different cross-section, however, for example a rectangular or arc-shaped or other flow-advantageous cross-section. In this case, the decisive expansion diameter $D_{EW}$ is the maximal diameter of the cross-sectional widened region 49.

It is true that it lies within the scope of the invention to use a known, two-part bearing sleeve in place of the one-part bearing sleeve. It is an advantage of the one-part bearing sleeve, however, that assembly is significantly simplified. The tolerance chain is also shorter, so that the bearing sleeve can be produced with greater precision. As a result, reliable locking of the closing valve is guaranteed.

Furthermore, the guide body of the bearing sleeve does not have to have a triangular cross-section, but rather can also be configured conically, for example, and can narrow toward the connector end 1b or can be configured cylindrically. The triangular cross-section, however, is particularly flow-advantageous and reduces the pressure loss.

Furthermore, the chambering and guide sleeve is also particularly advantageous. It guarantees that the closing valve is additionally supported in three ways. As a result, tilting and fluttering of the closing valve are prevented at a high through-flow amount. Coaxial guidance of the bearing sleeve is also increased. This feature is very important because as a result, blockage of the closing valve is also prevented. It also lies within the scope of the invention, however, that the valve sealing ring is chambered only by means of a known chambering sleeve 116, which does not have any guide crosspieces and cylindrical pipe segments, but is otherwise configured identically (FIG. 1, 6). It furthermore lies within the scope of the invention that the chambering and guide sleeve has a continuous cylinder pipe instead of the cylinder pipe segments.

Figure 10A:
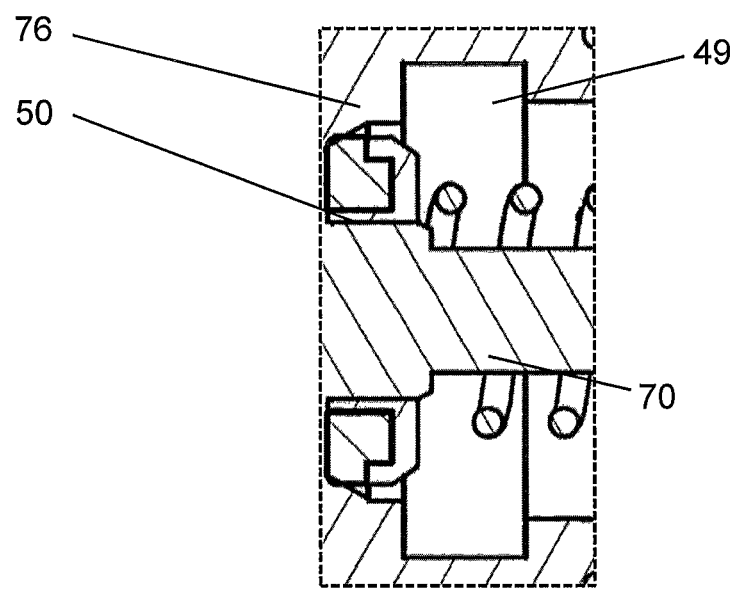
FIG. 10a shows a cutout of the cross sectional widened region with a part of the closing valve.

FIG. 10a shows a cutout in the area of the cross-sectional widened region 49 with a part of the closing valve 50. The valve sealing ring 76 surrounds the closing valve 50. The cross sectional widened region 49 has a rectangular cross-section.

Figure 10B:
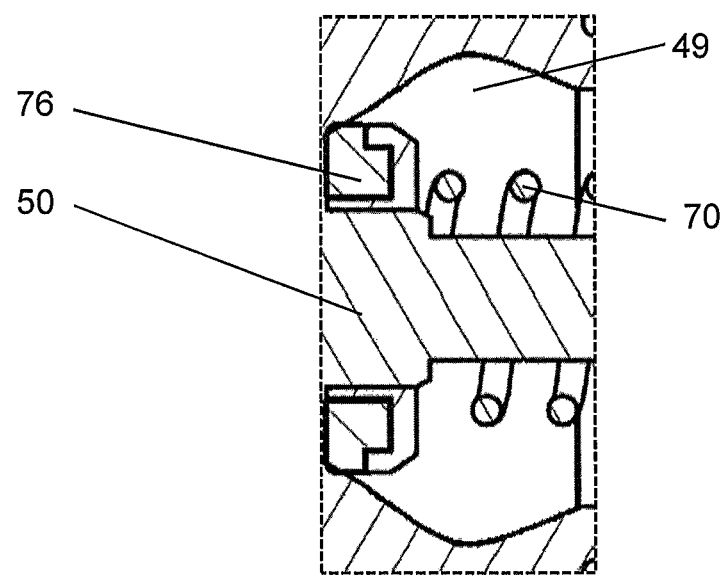
FIG. 10b shows another cutout of the cross-sectional widened region with a part of the closing valve.
Figure 11:
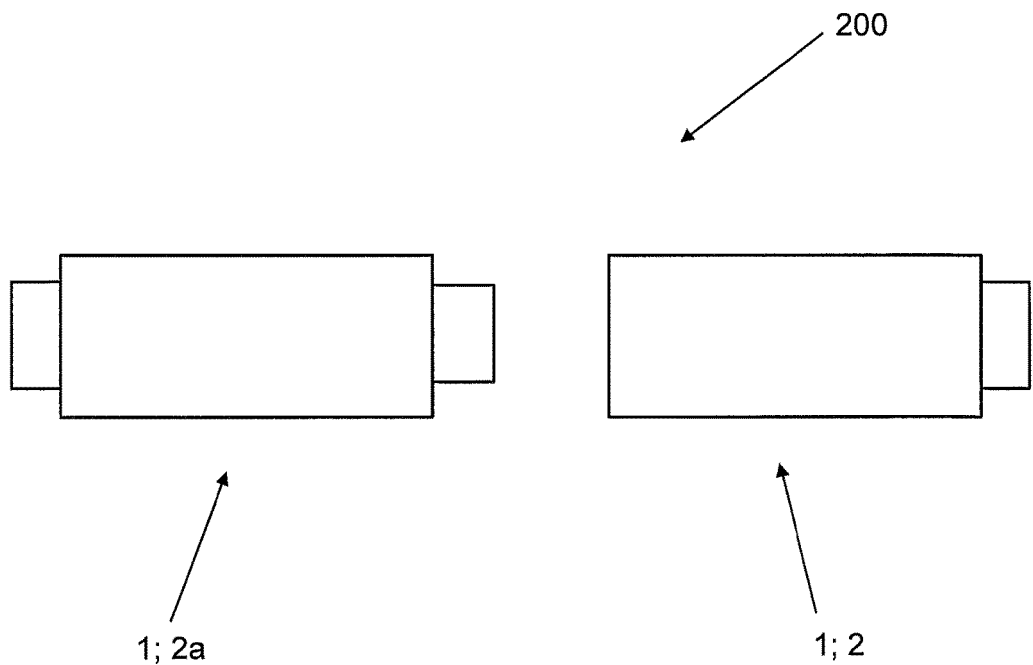
FIG. 11 shows another embodiment of a quick release coupling.

FIG. 10b shows a cutout in the area of the cross-sectional widened region 49 with a part of the closing valve 50. The valve sealing ring 76 surrounds the closing valve 50. The cross sectional widened region 49 has an arc-shaped cross-section. FIG. 11 shows a quick-release coupling 200 with a first coupling part 1, namely a coupling cuff 2, and a second coupling part 1, namely a coupling plug 2a.

The coupling part according to the invention can furthermore, of course, also be a coupling plug. It furthermore lies in the scope of the invention that the respective counter-coupling part is configured identically or differently with regard to the cross-sectional widened region.

Furthermore, a different locking device can also be present in place of the blocking ball locking device, for releasable locking of the two coupling parts.

Although only a few embodiments of the present invention have been shown and described, it is to be understood that many changes and modifications may be made thereunto without departing from the spirit and scope of the invention.

What is claimed is:

1. A coupling part for a quick-release coupling for a high-pressure hydraulic line comprising:
   a coupling housing having a through-flow channel, a valve device disposed within the through-flow channel, and a conical valve seat surface, said valve device having a tappet-shaped closing valve for closing off the through-flow channel in an uncoupled state of the coupling part;
   wherein the closing valve has a longitudinal valve axis and a valve head, said valve head having a conical surface and a valve sealing ring for sealing contact with the valve seat surface, wherein the valve sealing ring has a ring circumference surface that projects beyond the conical surface in a radial direction and has a valve seal diameter $D_{VD}$;
   wherein the flow-through channel has a ring-shaped cross-sectional widened region having a maximal expansion diameter $D_{EW}$, wherein the cross-sectional widened region lies radially opposite the ring circumference surface in a maximally open position of the closing valve with regard to the longitudinal valve axis,
   wherein the closing valve, viewed in a direction of the longitudinal valve axis, has a first, head-side valve end and a second valve end, and the valve device has a bearing sleeve at the second valve end, and wherein the closing valve is mounted by the bearing sleeve so as to slide and to be displaceable, back and forth, in the coupling housing, in an axial direction, and wherein the coupling part has a locking device for locking the closing valve in an open position, wherein the locking device has:
   a) spring clamp, having first and second spring arms,
   b) the bearing sleeve which is configured with
      a guide body having radially projecting guide elements, wherein the bearing sleeve is mounted by radially projecting guide elements in the coupling housing, and first and second clamp accommodation recesses that pass through the guide body, wherein the first and second spring arms pass through the first and second clamp accommodation recesses, respectively,
      a guide pipe that follows the guide body at one end and projects away from the guide body in the axial direction, and
      a bearing recess that passes through the bearing sleeve in the axial direction,
   c) a sliding sleeve that is mounted so as to be displaceable, back and forth, in a sliding sleeve guide groove of the valve stem, by a limited amount, in the axial direction, wherein
   d) the sliding sleeve and the valve stem are each mounted in the bearing recess so as to slide and be displaceable in the axial direction,
   e) the sliding sleeve, the spring clamp, and the sliding sleeve guide groove interact to lock the closing valve in an open position, and
   f) the guide body and the guide pipe are configured in one piece or in two pieces.

2. The coupling part according to claim 1, wherein a ratio $D_{EW}/D_{VD}$ amounts to 1.35 to 1.6.

3. The coupling part according to claim 1, wherein the cross-sectional widened region has a circular-cylindrical expansion surface that has the maximal expansion diameter $D_{EW}$.

4. The coupling part according to claim 1, wherein the cross-sectional widened region has a trapezoid or rectangular or arc-shaped cross-section.

5. The coupling part according to claim 3, wherein the cross-sectional widened region has a conical, widening first transition surface followed by the circular-cylindrical expansion surface, and a conical, narrowing second transition surface, wherein the expansion surface is disposed between the first and second transition surfaces.

6. The coupling part according to claim 1, wherein the cross-sectional widened region follows the valve seat surface directly in an axial direction.

7. The coupling part according to claim 1, wherein the coupling housing has a circular-cylindrical surface, following the cross-sectional widened region directly in an axial direction, wherein the closing valve, is mounted on the circular-cylindrical surface so as to slide.

8. The coupling part according to claim 1, wherein the closing valve has a chambering and guide sleeve for chambering of the valve sealing ring, wherein the chambering and guide sleeve has a plurality of guide elements that are adjacent to one another in a circumference direction, wherein each guide element projects radially, and wherein the chambering and guide sleeve is mounted in the coupling housing so as to be slidable and displaceable, back and forth, in an axial direction, by the guide elements.

9. The coupling part according to claim 8, wherein the guide elements are guide crosspieces that project in the radial direction, wherein each guide element has a longitudinal expanse parallel to the longitudinal valve axis and a domed, cylindrical outer crosspiece surface, wherein a through-flow groove is formed between adjacent guide elements in the circumference direction.

10. The coupling part according to claim 1, wherein the closing valve has a chambering and guide sleeve for chambering of the valve sealing ring and a valve body that has the valve head and a valve stem following the valve head, wherein the valve sealing ring is disposed between the valve head and the chambering and guide sleeve in an axial direction, and held so as to be non-displaceable in the axial direction and a radial direction.

11. The coupling part according to claim 10, wherein the chambering and guide sleeve is mounted on the valve body so as to be non-displaceable and non-rotatable.

12. The coupling part according to claim 1, wherein the closing valve has a closed position, closing the through-flow channel off, and the maximally open position, not closing the through-flow channel, wherein the closing valve is mounted to slide and be displaceable from the closed position into the maximally open position, in an axial valve opening direction, in the coupling housing, and wherein the closing valve is mounted to slide and be displaceable from the open position into the maximally closed position in an axial valve closing direction, opposite to the valve opening direction, in the coupling housing.

13. The coupling part according to claim 12, wherein the closing valve is lockable in the maximally open position by a locking device, in such a manner that the closing valve is mounted in the coupling housing so as to be non-displaceable in the valve opening direction.

14. The coupling part according to claim 1, wherein the first and second spring arms engage around the valve stem on both sides of the longitudinal valve axis and are engaged in the sliding valve guide groove in the maximally open position of the closing valve, so that the closing valve is non-displaceable in the valve opening position, and engage around the sliding sleeve in the closed position of the closing valve, so that the closing valve is displaceable in the axial direction in the coupling housing.

15. The coupling part according to claim 1, wherein the valve device has a closing spring, standing in connection with the closing valve so as to drive the closing valve in a valve closing direction, wherein the closing spring is supported on the valve head at a first end of the closing spring and on the bearing sleeve at a second end of the closing spring.

16. The coupling part according to claim 1, wherein the bearing sleeve has a spreader for spreading the spring arms during movement of the closing valve from the maximally open position to the closed position, wherein the spring arms are spread open using the spreader, in such a manner that the spring arms are pressed out of the sliding sleeve guide groove and pushed onto the sliding sleeve.

17. A quick-release coupling for a high-pressure hydraulic line comprising first and second coupling parts releaseably lockable together with one another:
   wherein each coupling part has a coupling housing having a through-flow channel and a valve device disposed within the through-flow channel;
   wherein each valve device has a tappet-shaped closing valve for closing the through-flow channel in an uncoupled state of the quick-release coupling; and
   wherein at least one of the first and second coupling parts comprises a conical valve seat surface, wherein the closing valve has a longitudinal valve axis and a valve head, said valve head having a conical surface and a valve sealing ring for sealing contact with the valve seat surface, wherein the valve sealing ring has a ring circumference surface that projects beyond the conical surface in a radial direction and has a valve seal diameter $D_{VD}$, wherein the flow-through channel has a ring-shaped cross-sectional widened region having a maximal expansion diameter $D_{EW}$, wherein the cross-sectional widened region lies radially opposite the ring circumference surface in a maximally open position of the closing valve with regard to the longitudinal valve axis, and wherein the closing valve has a chambering and guide sleeve for chambering of the valve sealing ring, wherein the chambering and guide sleeve has a plurality of guide elements that are adjacent to one another in a circumference direction, wherein each guide element projects radially, and wherein the chambering and guide sleeve is mounted in the coupling housing so as to be slidable and displaceable, back and forth, in an axial direction, by the guide elements.

18. The coupling part according to claim 12, wherein sliding of the closing valve in the axial valve opening direction, in the coupling housing, is relative to the bearing sleeve and wherein sliding of the closing valve opposite to the valve opening direction, in the coupling housing, is relative to the bearing sleeve.

19. A quick-release coupling for a high-pressure hydraulic line comprising first and second coupling parts releaseably lockable together with one another:
   wherein each coupling part has a coupling housing having a through-flow channel and a valve device disposed within the through-flow channel;
   wherein each valve device has a tappet-shaped closing valve for closing the through-flow channel in an uncoupled state of the quick-release coupling; and
   wherein at least one of the first and second coupling parts comprises a conical valve seat surface, wherein the closing valve has a longitudinal valve axis and a valve head, said valve head having a conical surface and a valve sealing ring for sealing contact with the valve seat surface, wherein the valve sealing ring has a ring circumference surface that projects beyond the conical surface in a radial direction and has a valve seal diameter $D_{VD}$, and wherein the flow-through channel has a ring-shaped cross-sectional widened region having a maximal expansion diameter $D_{EW}$, wherein the cross-sectional widened region lies radially opposite the ring circumference surface in a maximally open position of the closing valve with regard to the longitudinal valve axis, wherein the closing valve, viewed in a direction of the longitudinal valve axis, has a first, head-side valve end and a second valve end, and the valve device has a bearing sleeve at the second valve end, wherein the closing valve is mounted by the bearing sleeve so as to slide and to be displaceable, back and forth, in the coupling housing, in an axial direction; and wherein the coupling part has a locking device for locking the closing valve in an open position, wherein the locking device has:
   a) a spring clamp, having first and second spring arms,
   b) the bearing sleeve which is configured with
      a guide body having radially projecting guide elements, wherein the bearing sleeve is mounted by radially projecting guide elements in the coupling housing, and first and second clamp accommodation recesses that pass through the guide body, wherein the first and second spring arms pass through the first and second clamp accommodation recesses, respectively,
      a guide pipe that follows the guide body at one end and projects away from the guide body in the axial direction, and
      a bearing recess that passes through the bearing sleeve in the axial direction,
   c) a sliding sleeve that is mounted so as to be displaceable, back and forth, in a sliding sleeve guide groove of the valve stem, by a limited amount, in the axial direction, wherein
   d) the sliding sleeve and the valve stem are each mounted in the bearing recess so as to slide and be displaceable in the axial direction,
   e) the sliding sleeve, the spring clamp, and the sliding sleeve guide groove interact to lock the closing valve in an open position, and
   f) the guide body and the guide pipe are configured in one piece or in two pieces.

20. A coupling part for a quick-release coupling for a high-pressure hydraulic line comprising:
   a coupling housing having a through-flow channel, a valve device disposed within the through-flow channel, and a conical valve seat surface, said valve device having a tappet-shaped closing valve for closing off the through-flow channel in an uncoupled state of the coupling part; wherein the closing valve has a longitudinal valve axis and a valve head, said valve head having a conical surface and a valve sealing ring for sealing contact with the valve seat surface, wherein the valve sealing ring has a ring circumference surface that projects beyond the conical surface in a radial direction and has a valve seal diameter $D_{VD}$; wherein the flow-through channel has a ring-shaped cross-sectional widened region having a maximal expansion diameter $D_{EW}$, wherein the cross-sectional widened region lies radially opposite the ring circumference surface in a maximally open position of the closing valve with regard to the longitudinal valve axis; wherein the closing valve has a chambering and guide sleeve for chambering of the valve sealing ring, wherein the chambering and guide sleeve has a plurality of guide elements that are adjacent to one another in a circumference direction, wherein each guide element projects radially, and wherein the chambering and guide sleeve is mounted in the coupling housing so as to be slidable and displaceable, back and forth in an axial direction, by the guide elements.

* * * * *

UNITED STATES PATENT AND TRADEMARK OFFICE
CERTIFICATE OF CORRECTION

PATENT NO. : 9,664,319 B2  
APPLICATION NO. : 14/741682  
DATED : May 30, 2017  
INVENTOR(S) : Weiland et al.

Page 1 of 1

It is certified that error appears in the above-identified patent and that said Letters Patent is hereby corrected as shown below:

In the Claims

In particular, in Column 15, Line 50, (Claim 1) before the word "spring" (first occurrence) please insert: --a--.

Signed and Sealed this
Eleventh Day of July, 2017

Joseph Matal
*Performing the Functions and Duties of the
Under Secretary of Commerce for Intellectual Property and
Director of the United States Patent and Trademark Office*